(12) United States Patent
Carcagno et al.

(10) Patent No.: US 8,840,152 B2
(45) Date of Patent: Sep. 23, 2014

(54) THIN-WALLED PIPE JOINT

(75) Inventors: Gabriel Carcagno, Buenos Aires (AR);
Alfredo Quiroga, Buenos Aires (AR);
Gaston Mazzaferro, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 230 days.

(21) Appl. No.: 13/073,917

(22) Filed: Mar. 28, 2011

(65) Prior Publication Data

US 2011/0233926 A1    Sep. 29, 2011

(30) Foreign Application Priority Data

Mar. 26, 2010 (EP) ..................... 10003260
Apr. 23, 2010 (EP) ..................... 10004361

(51) Int. Cl.
*F16L 19/065* (2006.01)
*F16L 19/02* (2006.01)
*F16L 19/025* (2006.01)
*F16L 19/028* (2006.01)

(52) U.S. Cl.
CPC ........... *F16L 19/0206* (2013.01); *F16L 19/025* (2013.01); *F16L 19/0286* (2013.01)
USPC ........... 285/343; 285/333; 285/339; 285/356; 285/393

(58) Field of Classification Search
CPC ....... F16L 15/005; F16L 15/009; F16L 15/08; F16L 19/061; F16L 19/065; F16L 19/0653
USPC ......... 285/343, 353, 356, 357, 392, 393, 339, 285/384, 385, 333, 334
See application file for complete search history.

(56) References Cited

U.S. PATENT DOCUMENTS 1,590,357 A    6/1926 Feisthamel
1,671,458 A    5/1928 Wilson
(Continued)

FOREIGN PATENT DOCUMENTS

AT    388791 B    8/1989
CA    2319926    7/2008
(Continued)

OTHER PUBLICATIONS

"Specification for Threading, Gauging and Thread Inspection of Casing, Tubing, and Line Pipe Threads," American Petroleum Institute, Specification 5B, Apr. 2008, 15th Edition (Excerpts Only).

(Continued)

*Primary Examiner* — James Hewitt
(74) *Attorney, Agent, or Firm* — Knobbe Martens Olson & Bear, LLP

(57) ABSTRACT

Thin-walled pipe joints can include a first pipe and a second pipe. The first pipe includes a hollow pin member positioned at about an end of the first pipe. The second pipe includes a hollow box member positioned at about an end of the second pipe. The hollow box member is further configured to at least partially surround the pin member of the first pipe. The joint also includes a first ring placed adjacent an end of the hollow pin member and a second ring engaged with the box member. The second ring substantially axially abuts against the first ring and the first ring substantially axially abuts the box member. The second ring further generally extends from the first ring in a direction opposite to the end of the pin member adjacent to the box member.

17 Claims, 6 Drawing Sheets

(56) References Cited

U.S. PATENT DOCUMENTS

| | | | |
|---|---|---|---|
| 1,799,762 A * | 4/1931 | Rathbun | 285/89 |
| 1,999,706 A | 4/1935 | Spang | |
| 2,075,427 A | 3/1937 | Church | |
| 2,211,173 A | 8/1940 | Shaffer | |
| 2,487,241 A | 11/1949 | Hilton | |
| 2,567,113 A * | 9/1951 | Kristensen | 285/342 |
| 2,631,871 A | 3/1953 | Stone | |
| 2,841,429 A | 10/1955 | McCuistion | |
| 2,766,998 A | 10/1956 | Watts et al. | |
| 2,992,021 A | 7/1961 | Nay | |
| 2,992,613 A | 7/1961 | Bodine | |
| 3,016,250 A * | 1/1962 | Franck | 285/342 |
| 3,041,088 A | 6/1962 | Brandon | |
| 3,054,628 A | 9/1962 | Hardy et al. | |
| 3,150,889 A | 9/1964 | Watts | |
| 3,266,824 A * | 8/1966 | Nealy | 285/212 |
| 3,307,860 A | 3/1967 | Blount et al. | |
| 3,325,174 A | 6/1967 | Weaver | |
| 3,362,731 A * | 1/1968 | Gasche et al. | 285/212 |
| 3,489,437 A | 1/1970 | Duret | |
| 3,552,781 A * | 1/1971 | Helland | 85/322 |
| 3,572,777 A | 3/1971 | Blose et al. | |
| 3,599,931 A | 8/1971 | Hanson | |
| 3,733,093 A * | 5/1973 | Seiler | 285/342 |
| 3,810,793 A | 5/1974 | Heller | |
| 3,854,760 A | 12/1974 | Duret | |
| 3,889,989 A | 6/1975 | Legris et al. | |
| 3,893,919 A | 7/1975 | Flegel et al. | |
| 3,986,731 A * | 10/1976 | DeHoff | 285/81 |
| 4,014,568 A * | 3/1977 | Carter et al. | 285/39 |
| 4,147,368 A | 4/1979 | Baker et al. | |
| 4,299,412 A | 11/1981 | Parmann | |
| 4,366,971 A * | 1/1983 | Lula | 285/55 |
| 4,373,750 A | 2/1983 | Mantelle et al. | |
| 4,384,737 A | 5/1983 | Reusser | |
| 4,406,561 A | 9/1983 | Ewing | |
| 4,426,095 A | 1/1984 | Buttner | |
| 4,475,839 A | 10/1984 | Strandberg | |
| 4,570,982 A | 2/1986 | Blose et al. | |
| 4,591,195 A | 5/1986 | Chelette et al. | |
| 4,601,491 A | 7/1986 | Bell, Jr. et al. | |
| 4,602,807 A | 7/1986 | Bowers | |
| 4,623,173 A | 11/1986 | Handa et al. | |
| 4,662,659 A | 5/1987 | Blose et al. | |
| 4,688,832 A | 8/1987 | Ortloff et al. | |
| 4,706,997 A | 11/1987 | Carstensen | |
| 4,762,344 A | 8/1988 | Perkins et al. | |
| 4,844,517 A | 7/1989 | Beiley et al. | |
| 4,856,828 A | 8/1989 | Kessler et al. | |
| 4,955,645 A | 9/1990 | Weems | |
| 4,958,862 A | 9/1990 | Cappelli et al. | |
| 4,988,127 A | 1/1991 | Cartensen | |
| 5,007,665 A | 4/1991 | Bovisio et al. | |
| 5,067,874 A | 11/1991 | Foote | |
| 5,137,310 A | 8/1992 | Noel et al. | |
| 5,143,381 A | 9/1992 | Temple | |
| 5,180,008 A | 1/1993 | Aldridge et al. | |
| 5,242,199 A * | 9/1993 | Hann et al. | 285/148.19 |
| 5,348,350 A | 9/1994 | Blose et al. | |
| 5,505,502 A | 4/1996 | Smith et al. | |
| 5,515,707 A | 5/1996 | Smith | |
| 5,712,706 A | 1/1998 | Castore et al. | |
| 5,794,985 A | 8/1998 | Mallis | |
| 5,810,401 A | 9/1998 | Mosing et al. | |
| 5,879,030 A * | 3/1999 | Clayson et al. | 285/24 |
| 6,044,539 A | 4/2000 | Guzowski | |
| 6,045,165 A | 4/2000 | Sugino et al. | |
| 6,056,324 A | 5/2000 | Reimert et al. | |
| 6,070,912 A | 6/2000 | Latham | |
| 6,173,968 B1 | 1/2001 | Nelson et al. | |
| 6,347,814 B1 | 2/2002 | Cerruti | |
| 6,349,979 B1 | 2/2002 | Noel et al. | |
| 6,412,831 B1 | 7/2002 | Noel et al. | |
| 6,447,025 B1 | 9/2002 | Smith | |
| 6,478,344 B2 | 11/2002 | Pallini, Jr. et al. | |
| 6,481,760 B1 | 11/2002 | Noel et al. | |
| 6,494,499 B1 | 12/2002 | Galle, Sr. et al. | |
| 6,550,822 B2 | 4/2003 | Mannella et al. | |
| 6,557,906 B1 | 5/2003 | Carcagno | |
| 6,581,940 B2 | 6/2003 | Dittel | |
| 6,752,436 B1 | 6/2004 | Verdillon | |
| 6,755,447 B2 | 6/2004 | Galle, Jr. et al. | |
| 6,764,108 B2 | 7/2004 | Ernst et al. | |
| 6,851,727 B2 | 2/2005 | Carcagno et al. | |
| 6,857,668 B2 | 2/2005 | Otten et al. | |
| 6,883,804 B2 | 4/2005 | Cobb | |
| 6,905,150 B2 | 6/2005 | Carcagno et al. | |
| 6,921,110 B2 | 7/2005 | Morotti et al. | |
| 6,971,681 B2 | 12/2005 | Dell'Erba et al. | |
| 6,991,267 B2 | 1/2006 | Ernst et al. | |
| 7,014,223 B2 | 3/2006 | Della Pina et al. | |
| 7,066,499 B2 | 6/2006 | Della Pina et al. | |
| 7,108,063 B2 | 9/2006 | Carstensen | |
| 7,255,374 B2 | 8/2007 | Carcagno et al. | |
| 7,284,770 B2 | 10/2007 | Dell'erba et al. | |
| 7,431,347 B2 | 10/2008 | Ernst et al. | |
| 7,464,449 B2 | 12/2008 | Santi et al. | |
| 7,475,476 B2 | 1/2009 | Roussie | |
| 7,478,842 B2 | 1/2009 | Reynolds, Jr. et al. | |
| 7,506,900 B2 | 3/2009 | Carcagno et al. | |
| 7,621,034 B2 | 11/2009 | Roussie | |
| 7,735,879 B2 | 6/2010 | Toscano et al. | |
| 7,753,416 B2 | 7/2010 | Mazzaferro et al. | |
| 8,215,680 B2 | 7/2012 | Santi | |
| 8,262,094 B2 | 9/2012 | Beele | |
| 8,262,140 B2 | 9/2012 | Santi et al. | |
| 8,333,409 B2 | 12/2012 | Santi et al. | |
| 8,544,304 B2 | 10/2013 | Santi | |
| 8,636,856 B2 | 1/2014 | Altschuler et al. | |
| 2002/0153671 A1 | 10/2002 | Raymond et al. | |
| 2003/0168859 A1 | 9/2003 | Watts | |
| 2004/0118490 A1 | 6/2004 | Klueh et al. | |
| 2004/0118569 A1 | 6/2004 | Brill et al. | |
| 2004/0195835 A1 | 10/2004 | Noel et al. | |
| 2004/0262919 A1 | 12/2004 | Dutilleul et al. | |
| 2005/0012278 A1 | 1/2005 | Delange | |
| 2005/0093250 A1 | 5/2005 | Santi et al. | |
| 2005/0166986 A1 | 8/2005 | Dell'erba et al. | |
| 2006/0006600 A1 | 1/2006 | Roussie | |
| 2006/0273586 A1 | 12/2006 | Reynolds, Jr. et al. | |
| 2007/0039149 A1 | 2/2007 | Roussie | |
| 2007/0246219 A1 | 10/2007 | Manella et al. | |
| 2008/0264129 A1 | 10/2008 | Cheppe et al. | |
| 2008/0303274 A1 | 12/2008 | Mazzaferro et al. | |
| 2010/0181727 A1 | 7/2010 | Santi et al. | |
| 2010/0181761 A1 | 7/2010 | Santi et al. | |
| 2010/0187808 A1 | 7/2010 | Santi | |
| 2011/0008101 A1 | 1/2011 | Santi et al. | |
| 2011/0041581 A1 | 2/2011 | Santi | |
| 2011/0042946 A1 | 2/2011 | Santi | |
| 2011/0097235 A1 | 4/2011 | Turconi et al. | |
| 2011/0133449 A1 | 6/2011 | Mazzaferro | |
| 2011/0233925 A1 | 9/2011 | Pina | |
| 2011/0233926 A1 | 9/2011 | Carcagno | |
| 2012/0032435 A1 | 2/2012 | Carcagno | |

FOREIGN PATENT DOCUMENTS

| | | |
|---|---|---|
| DE | 3310226 A1 | 10/1984 |
| EP | 0 032 265 | 7/1981 |
| EP | 0 104 720 | 4/1984 |
| EP | 0 159 385 | 10/1985 |
| EP | 0309179 A1 | 3/1989 |
| EP | 0 340 385 | 11/1989 |
| EP | 0 989 196 | 3/2000 |
| EP | 1065423 A2 | 1/2001 |
| EP | 1 277 848 | 1/2003 |
| EP | 1 296 088 | 3/2003 |
| EP | 1 362977 | 11/2003 |
| EP | 1 705 415 | 9/2006 |
| EP | 1 726 861 | 11/2006 |
| EP | 1554518 B1 | 1/2009 |
| FR | 2 704 042 A | 10/1994 |
| FR | 2 848 282 A1 | 6/2004 |

(56) References Cited

FOREIGN PATENT DOCUMENTS

| | | |
|---|---|---|
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/087646 | 10/2003 |
| WO | WO 2004/033951 | 4/2004 |
| WO | WO 2004/053376 | 6/2004 |
| WO | WO 2006/087361 | 8/2006 |
| WO | WO 2007/002576 A2 | 1/2007 |
| WO | WO 2007/017082 | 2/2007 |
| WO | WO 2007/017161 | 2/2007 |
| WO | WO 2007/028443 | 3/2007 |
| WO | WO 2007/063079 A1 | 6/2007 |
| WO | WO 2008/090411 | 7/2008 |
| WO | WO 2009/000766 | 12/2008 |
| WO | WO 2009/000851 | 12/2008 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

European Search Report, re EPO Application No. EP 10 00 4361, dated Aug. 2, 2011.

\* cited by examiner

THIN-WALLED PIPE JOINT

CROSS-REFERENCE TO RELATED APPLICATIONS

This Application claims priority to European Patent Application No. 10003260.6, filed on Mar. 26, 2010, and European Patent Application No. 10 004 361.1, filed on Apr. 23, 2010. The entirety of each of these applications is hereby incorporated by reference.

BACKGROUND

1. Field

Embodiments of the present disclosure concern pipe joints for connecting a first pipe to a second pipe and, in particular, to coupling of pipes such as thin walled tubes.

2. Description of the Related Art

Connecting two pipes with each other is a common objective and diverse devices have been proposed to accomplish this objective. International Patent Publication No. WO 2007/002576 discloses fittings for use with different types of tubing. One such fitting of WO 2007/002576 includes a gripping member having a sharp tube indenting edge that provides a seal between the tube gripping member and the tube. Another such fitting of WO 2007/002576 includes a tube gripping member having a body indenting edge that provides a seal between the tube gripping member and a fitting body. However, this solution is not capable of use in the oil and gas industry, as the standards which apply for the oil and gas industry concerning the connection of pipes with each other require reusability of all single elements. This requirement is not fulfilled in the device disclosed in WO 2007/002576, as plastic deformation, such as an indentation, is experienced in one of the tubes.

Other solutions are disclosed in U.S. Pat. No. 4,844,517, European Patent No. 0309179, and European Patent No. 1065423. In U.S. Pat. No. 4,844,517, a nut member contacts a coupling union via mating threads, while the coupling union is connected to a tube via recesses and protrusions of the tube which are positioned in the grooves of the coupling union. During tightening, the nut member forces the coupling union to contact a sleeve member, which is attached to another tube via grooves and protrusions. However, this device has a drawback of being difficult to mount.

Similarly, in the solutions disclosed in EP 0309179 and EP 1065423, a plastic deformation, as in WO 2007/002576, is employed for achieving the sealing effect, which is not desirable for connection of pipes in the oil and gas industry.

Another pipe coupling is discussed in U.S. Pat. No. 3,889,989 that focuses on high pressure pipe couplings in which one end of a bored coupling body is externally threaded to receive a rigid nut. The body and the nut each have an internal tapering surface which is in contact with an asymmetrical bi-conical rigid bite-ring made of ductile metal. The ductile metal is compressed by ridges into circular grooves formed on the end of a pipe to be coupled. The bite-ring has, between its tapering sections, a central section that has a larger diameter than that of the tapering sections. The central section of the bite-ring incorporates a circumferential sealing lip which is arranged to bear against an end face of the coupling body.

This pipe coupling employs movement of the nut in relation to the coupling body. However, as above, plastic deformation, this time of the bite-ring, is used to achieve a fluid tight sealing between the respective elements.

Thus, while approaches to tightly couple a first pipe to a second pipe have been developed, each has drawbacks concerning fluid tightness and reusability. As such, these solutions do not satisfy the standards relevant in the oil and gas industry.

SUMMARY

Embodiments of the present disclosure provide systems and methods for joining pipes suitable for use in the oil and gas industry. Embodiments of the disclosed joints are easy to manufacture and safe for use in the field, with less fluid leakage resulting between the respective parts of the joint. As discussed in greater detail below, components of the joint may be reused, even after the pipe joint has been assembled for a first time. Methods are further disclosed to tightly couple a first pipe to a second pipe and substantially inhibit release of fluid contained within the first and second pipes.

For example, in one embodiment, a method of coupling a first pipe to a second pipe is provided. The method comprises inserting a first ring into a box member that is connected to an end of the second pipe. The box member may comprise first threads on an inner surface of the box member and the first ring may comprise inner threads on an inner surface of the first ring. The method further comprises inserting a second ring into the box member. The second ring may comprise outer threads on an outer surface of the second ring. The method additionally comprises inserting a pin member into the first ring. The pin member may be connected to an end of the first pipe and the pin member may comprise second threads on an outer surface of the pin member. The second ring may extend from the first ring in a direction opposite to an end of the pin member which is positioned adjacent to the box member.

In another embodiment, another method of fluidly coupling a first pipe to a second pipe is provided. The method comprises placing a second ring over a pin member, where the second ring comprises outer threads on an outer surface of the second ring. The pin member may be connected to an end of the first pipe and comprise second threads on an outer surface of the pin member. The method further comprises positioning a first ring on the outside of the pin member, where the first ring comprises inner threads on an inner surface of the first ring. The method also comprises inserting the combination of the pin member, the first ring and the second ring at least partially into a box member. The box member connected to an end of the second pipe and comprising first threads on an inner surface of the box member. The method additionally comprises inserting the second ring with its outer threads into the box member. The second ring may extend from the first ring in a direction opposite to an end of the pin member positioned adjacent to the box member.

A pipe joint for connecting a first pipe to a second pipe is also provided. The pipe joint comprises a hollow pin member connected to a first pipe. The pipe joint further comprise a hollow box member connected to a second pipe, the hollow box member configured so as to at least partially surround the pin member. The pipe joint also comprises a first ring positioned adjacent an end of said pin member. The pipe joint additionally comprises a second ring engaged with the box member. The second ring may abut axially against the first ring and extend axially from the first ring in a direction opposite to the end of the pin member. The first ring may abut axially against said box member.

Beneficially, according to the disclosed embodiments, thin walled pipes can be connected with each other. The pin member itself can be thin-walled. In certain embodiments, the pin member may also be an integral part of a first pipe or connected to this first pipe directly or indirectly.

The ability of the first ring to be screwed onto the second threads of the pin member at a production facility, such as a mill, provides significant advantages. For example, the threading operation can be avoided at the field, where the oil or gas rig is finalized. Thus, the operators in the field are not required to handle the threaded connection between the pin member and the first ring. In this manner, problems such as cross threading or overwinding can be avoided as the operator of the rig at the piping location (e.g., the field) will only have to screw of the second ring to the box member. Furthermore, as the second ring comprises an outer surface which is spaced apart from the outer surface of the pin member, the second ring does not necessarily have to be thin-walled. In further embodiments, a more robust thread can also be used between the second ring and the box member, thereby avoiding problems such as cross-threading or overwinding during the screwing operation.

Further advantages of the embodiments of the joint may include the following:

In an embodiment, the second ring may be releasably engaged with the box member.

In another embodiment, the first ring may be connected to the pin member by one or more of a threaded connection, a welding seam, an adhesive, and at least one circumferential groove. So configured, the joint may be long lasting and/or easy to be assembled. In further embodiments, the grooves may include a sawtooth-like configuration to make the connection safer and more long lasting.

In additional embodiment, the first ring may be an integral part of the pin member.

In further embodiments, the box member may comprise first threads on its inside. The first threads may be in contact with outer threads of the second ring. The second ring may be positioned between the pin member and the box member. The first ring may further comprise inner threads which are in mating contact with second threads on the outside of the pin member.

In other embodiments, the pin member may comprise a locating surface aligned in a transverse direction relative to the longitudinal axis of the pin member. The pin member may be in contact with the box member. The locating surface may further be orthogonally aligned relative to the longitudinal axis. By providing such a locating surface, a stop on the pin member can be provided to make the stopping of relative movement of the pin member in regards to the box member possible, as soon as the locating surface is in abutting contact with the box member.

In further embodiments, the box member may be directly and/or integrally connected to the second pipe. As such, the second pipe can be configured at the mill to be appropriately shaped for attachment with the second ring. In this manner, leakage between the box member and the second pipe may be inhibited.

In other embodiments, the first threads may be of different thread height and/or thread pitch and/or form the second threads. Beneficially, the handling of light threads, relative to heavy threads, can take place at a lower risk of damaging those light threads.

Though some elements of the joint may be pre-combined at the mill (e.g., those elements with the light threads to make conveyance of oil or gas possible), the overall joint may be finalized at the field. As an example, for a light thread, the standard API 8 round thread can be selected. However, in other embodiments, sawtooth threads and threads with non-helical geometries may be employed. Examples of light threads may include, but are not limited to, threads having consecutive circular protuberances that engage by actual make up instead of rotational make up. Such a light thread may be positioned in the contact area between the pin member and the first ring, for example, in the area of the second threads.

In certain embodiments, the first and second threads may be of the same thread type. As such, the manufacturing process can be simplified. The first threads on the inside of the box member and the outer threads of the second ring can be configured as a buttress-like thread. However, also different engagements can be used such as gripping or clamping devices.

It is especially advantageous if the first threads are of the sawtooth type. It has been experienced that those threads are relatively unlikely to become damaged and can still convey high forces and loads.

In an embodiment, when the first ring is configured with a smaller outer diameter than the inner diameter of the box member, an axial gap between the box member and the first ring may result, so that the manufacturing process can be simplified. In other embodiments, the first threads of the box member may not come in contact with the first ring when the box member is imposed onto the pin member, the first ring and the second ring. To heighten the fluid tightness, it is advantageous if a fluid tight seal is provided between the pin member and the box member, preferably in the vicinity of the locating surface of the pin member.

In embodiments where the second threads possess a thread height $h_{t2}$ in their middle between about 20% and about 50%, especially about 35% of a thread height $h_{t1}$ in the middle of the first threads, the thin wall of the pin member may avoid being corrupted by the first threads, though the first threads can still convey sufficiently high forces and loads.

Special beneficial effects may also be experienced if the fluid tight seal is configured as a resilient seal, such as an o-ring and/or configured as a metal-to-metal seal.

It is additionally advantageous in embodiments where the first ring is axially spaced apart from the box member.

In further embodiments, a pin shouldering nose of the pin member, such as a stop area, may be in contact with an o-ring in a groove-like recess in the box member.

In a further embodiment, the o-ring may be configured with a bigger outer circumferential diameter than the inner diameter of the groove-like recess in the box member. So configured, the o-ring can be easily introduced into the groove-like recess and does not fall apart during the manufacturing process.

In other embodiments, the first threads and the second threads, and their mating counterparts on the first and second rings, may be tapered. As such, the alignment of the respective threads with each other can be simplified so that damage to the threads can be minimized and costs during the manufacturing process can be lowered.

Standard components can be used if the pin member, the first ring, the second ring and the box member are having a generally angular cross section.

Additional advantages can be recognized in embodiments of the joint when, during the screwing of the second ring, only the second ring is moved relative to both the pin member and the box member. In this manner, substantially no relative movement between the pin member and box member may be experienced.

Manufacturing of the joint may be simplified as the pin member and the box member, which are respectively connected to the first pipe and second pipe, do not have to be rotated relative to each other. Only the second ring needs to be screwed into the box member so that the second ring abuts the first ring and forces the box member onto the locating surface of the pin member in the area of the stop.

In another embodiment, it may be advantageous when one or more threaded surfaces of the pipe joint are covered by at least one of a protective layer and a lubricant layer. In this manner, additional oil or grease is not needed to be inserted at a field site, when the relevant segments of the pipe joint are assembled.

BRIEF DESCRIPTION OF THE DRAWINGS

The aforementioned embodiments shall also be explained together in conjunction with the following figures.

All figures are of a schematic nature in order to simplify the understanding of the disclosed embodiments. For the same elements, the same reference signs are used in the figures.

DETAILED DESCRIPTION

Figure 1:
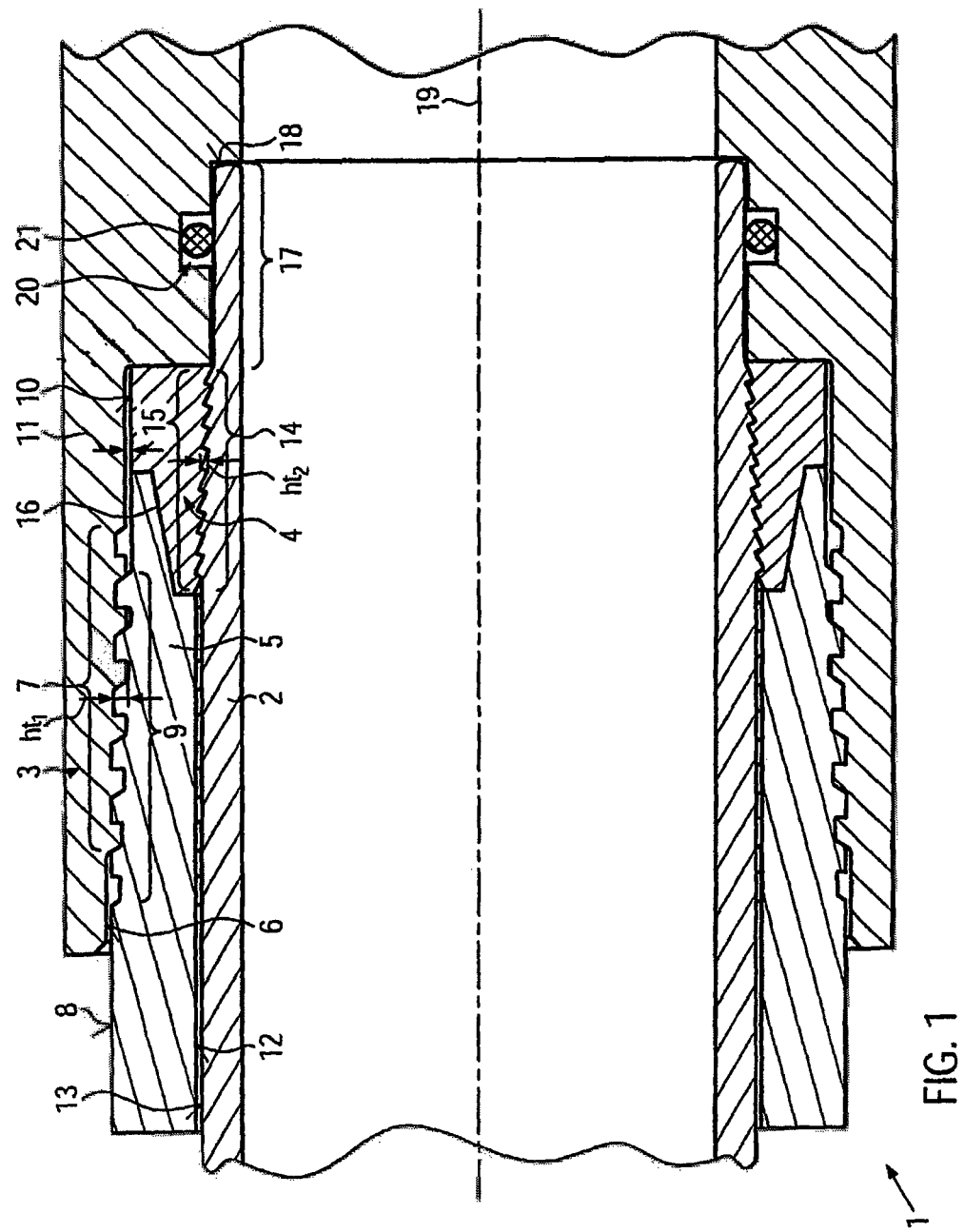
FIG. 1 is a schematic illustration of a first embodiment of a joint of the present disclosure in cross section.

In FIG. 1, a first embodiment of a pipe joint 1 is displayed. Such pipe joints may be used as joints suitable for use in the oil and gas industry (e.g., in oil and gas rigs, pipelines and drill rods).

The pipe joint 1 may be used to connect a first pipe to a second pipe. The first pipe may be in direct connection or integrally connected to a hollow pin member 2. The hollow pin member 2 may have a relatively thin wall and an annular cross section. Outside of the pin member 2, a hollow box member 3 may be arranged. The hollow box member 3 may be in direct connection or integrally connected to a second pipe. Between the pin member 2 and the box member 3, a first ring 4 and a second ring 5 may be arranged. The box member 3, the first ring 4, and the second ring 5 may all possess a generally annular cross section.

The box member 3 may comprise a first thread 7 on an inner surface 6. The second ring 5 may comprise outer threads 9 on an outer surface 8. The outer thread 9 and the first thread 7 may be in contact with each other and mate with each other.

An annular gap 11 may be present between an outer surface 10 of the first ring 4 and an inner surface 6 of the box member. An inner surface 12 of the second ring 5 may be in contact with an outer surface 13 of the pin member 2 or may be spaced apart from the outer surface 13.

Second threads 14 may be present on the outer surface of the pin member 2. The second threads 14 may be in contact with inner threads 15 on an inner surface of the first ring 4.

The first threads 7 of the box member 3, the outer threads 9 of the second ring 5, the second threads 14 of the pin member 2, and the inner threads 15 of the first ring may each taper at their respective ends. As a result, the threads with the largest height may be positioned in the middle of the respective threads.

The first ring 4 and the second ring 5 may touch each other along an engaging surface 16 of the first ring 4. This engaging surface 16 can have a transverse area. In the embodiment of FIG. 1, two orthogonal steps may be connected via a beveled surface. It is not necessary that both the steps and the beveled surface are contacted by the second ring 5. However, in embodiments where the first ring 4 and the second ring 5 contact each other along at least a part of the engaging surface, force can be transmitted from the first ring 4 to the second ring 5 and vice versa.

In certain embodiments, the first ring 4 may be in contact on one side with the box member 3. However, this contact is not necessary and a radial gap can exist at this position.

The second threads 14 of the pin member 2 and the inner threads 15 of the first ring 4 may posses a smaller height than the first threads 7 of the box member 3 and the outer threads 9 of the second ring 5. In fact, the height $h_{r2}$ (FIG. 1) may be about 20%-50% of the height $h_{r1}$ of the first threads 7 of the box member 3 (FIG. 3), preferably about 35% of the height $h_{r1}$.

In the embodiment of FIG. 1, the first threads 7 of the box member 3 and the outer threads 9 of the second ring 5 may be sawtooth threads. In other embodiments, the second threads 14 of the pin member 2 and the inner threads 15 of the first ring 4 may be metrical threads.

The pin member 2 may comprise a stop area 17 with a locating surface 18. The locating surface 18 may function to stop the movement of the pin member 2 towards the box member 3. The locating surface 18 may end in a plane which is orthogonally aligned in regards to a longitudinal axis 19 of the pipe joint 1.

The box member 3 may further comprise a groove-like recess 20 in which a compressible o-ring 21 may be positioned. Beneficially, this configuration may facilitate the establishment of a fluid tight seal between the box member 3 and the pin member 2.

While the locating surface 18 may act to stop the movement of the pin member 2 towards the box member 3, the o-ring 21 may be compressed to improve the fluid tightness between the pin member 2 and the box member 3. The o-ring 21 may be configured with a larger outer diameter than the respective diameter of the recess 20.

Figure 2:
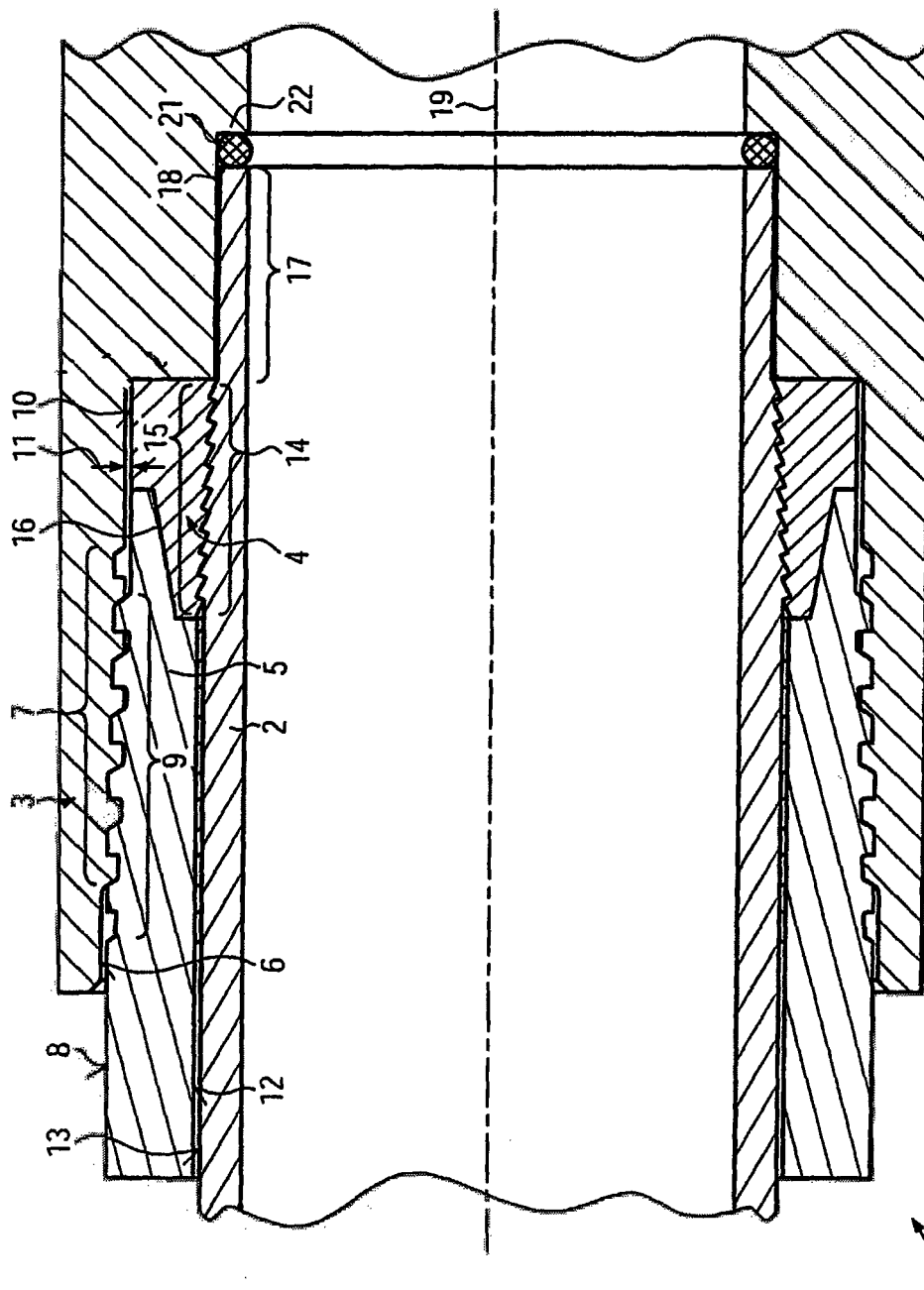
FIG. 2 is a schematic illustration of a second embodiment of a joint of the present disclosure in cross section.

Referring now to FIG. 2, another embodiment of the pipe joint 1 is illustrated. In the embodiment of FIG. 2, the position of the o-ring 21 may be changed, as compared with the embodiment illustrated in FIG. 1. The o-ring 21 in this second embodiment of the pipe joint 1 may be positioned between the locating surface 18 and a shoulder 22 of the box member 3.

In further embodiments of the pipe joint 1, instead of an o-ring formed from an elastic material, a metal-to-metal sealing connection between the pin member 2 and the box member 3 can be established.

In another embodiment, the pin member 2 may comprise a convex outer surface 13 in the stop area 17. In alternative embodiments, instead of a convex configuration of the outer surface of the pin member 2, a conical configuration may also be employed.

The box member 3 may also be configured with a convex surface adjacent to the stop area 17. In alternative embodiments, instead of such a convex surface, a conical surface may be present. In any case, the abutting surfaces of the pin member 2 and the box member 3 may be pressed against each other when assembled to provide a fluid tight seal.

Figure 3:
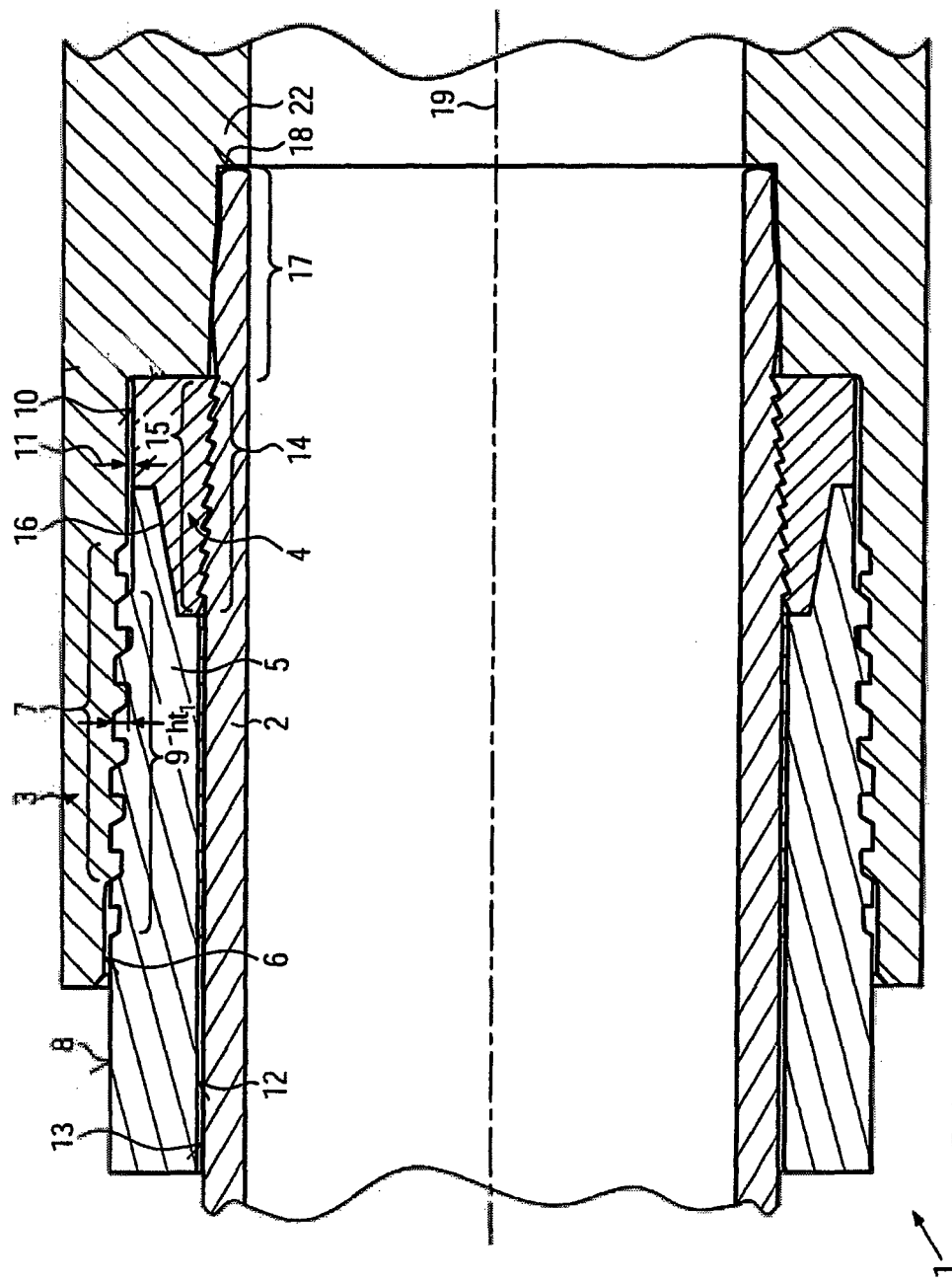
FIG. 3 is a schematic illustration of a third embodiment of a joint of the present disclosure in cross section.

Referring now to FIG. 3, another embodiment of the pipe joint 1 is illustrated. The locating surface 18 of the pipe joint 1 FIG. 3 may be configured in abutting alignment with the shoulder 22 of the box member 3.

Figure 4:
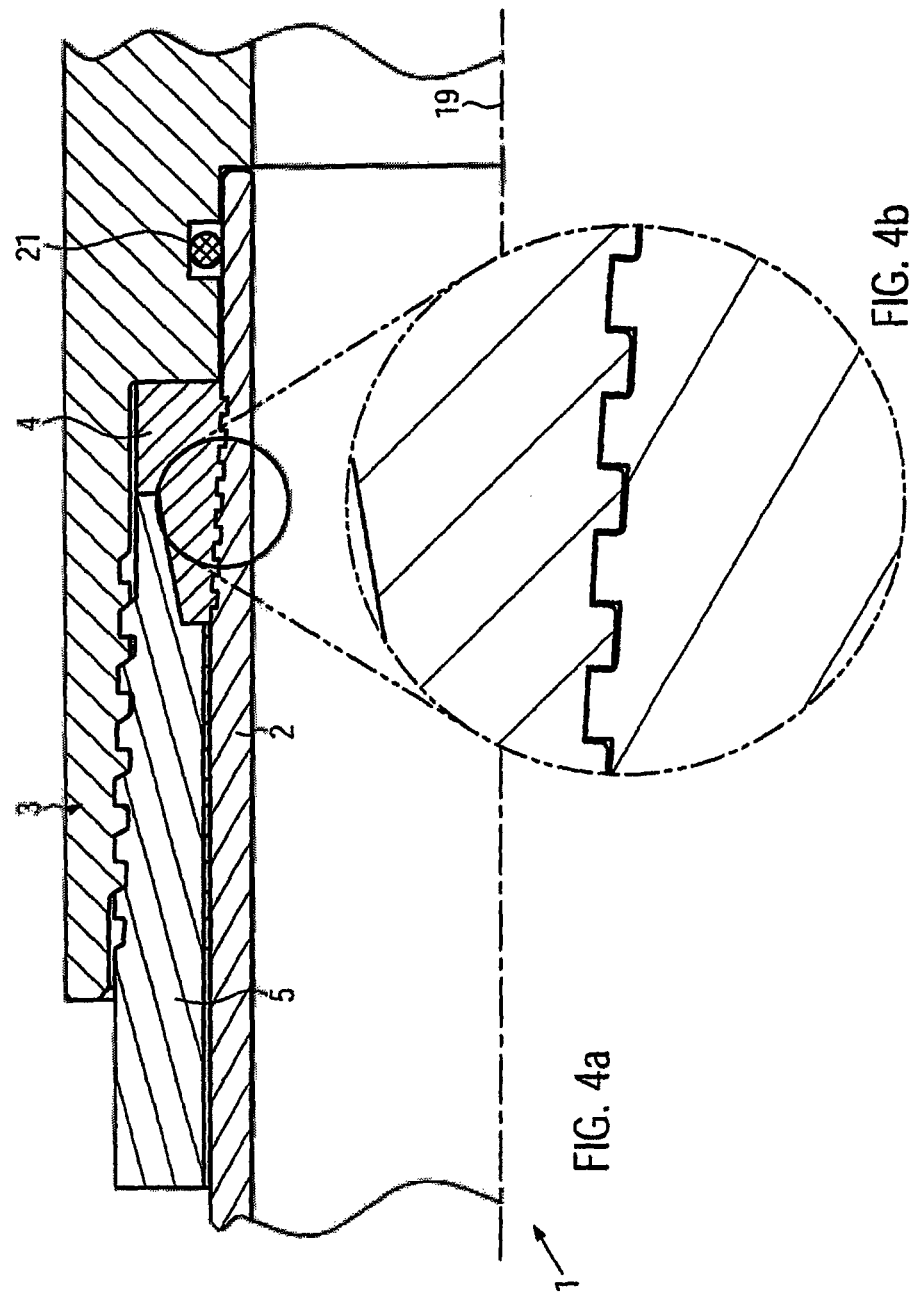
FIG. 4A is a schematic illustration of a fourth embodiment of a joint of the present disclosure displayed in cross section.
FIG. 4B is a schematic illustration of a detail of the groves between a first ring and a pin member of the embodiment of FIG. 4A.

Referring now to FIG. 4A, another embodiment of the pipe joint 1 is illustrated. As compared to the embodiment of FIG. 1, the embodiment of FIG. 4A may be configured such that the first ring 4 is pushed onto the pin member 2. Alternatively, upsetting methods, such cold upsetting, or forging methods can be used to combine the first ring 4 with the pin member 2. Furthermore, alternative connection methods, such as welding methods to achieve a welding seam between the first ring 4 and the pin member 2, may also be employed. In a further embodiment, an adhesive can be placed between the first ring 4 and the pin member 2.

In certain embodiments, circumferential grooves may also be incorporated either on the first ring 4 of the pin member 2 or both respective elements (e.g., on the first ring 4 and the pin member 2), so that a form fit can be achieved between those two elements. It is further possible that one or more of the grooves comprise a sawtooth configuration, as illustrated in FIG. 4B.

Figure 5:
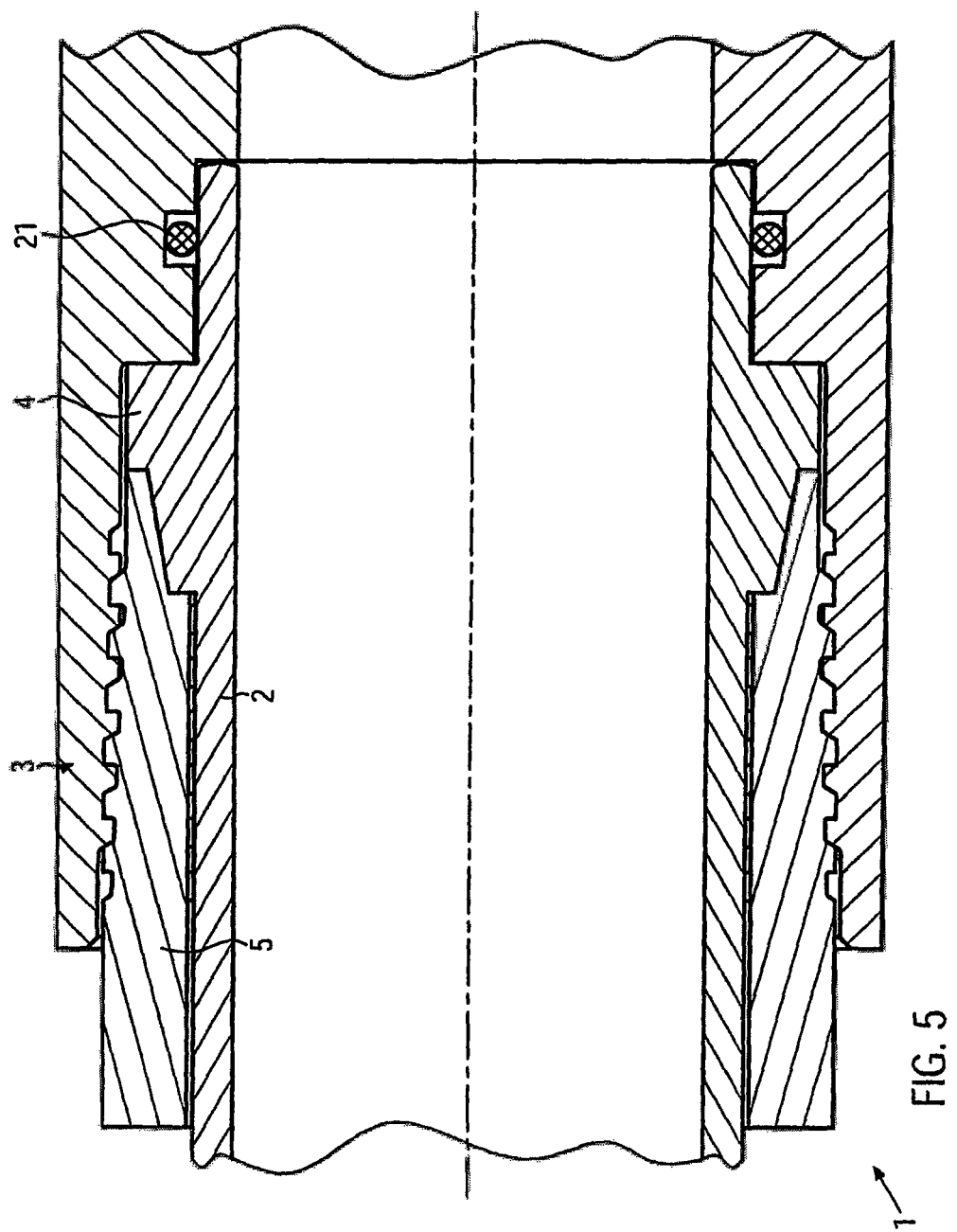
FIG. 5 is a schematic illustration of a fifth embodiment of a joint of the present disclosure in cross section.

In FIG. 5, another embodiment of the pipe joint 1 is illustrated. As illustrated in FIG. 5, the first ring 4 may be integrally connected to the pin member 2. Both elements may be formed from the same material.

Figure 6:
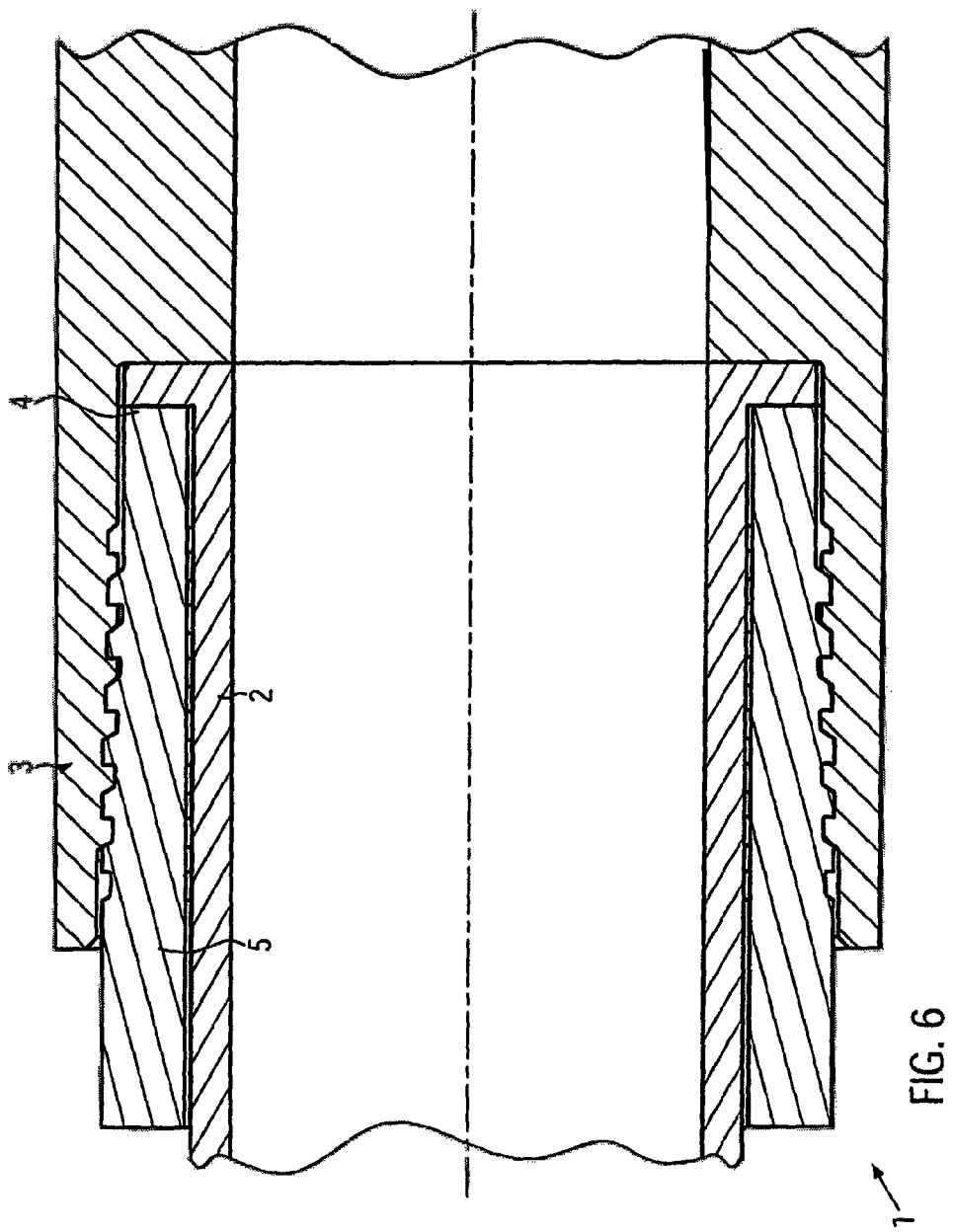
FIG. 6 is a schematic illustration of a sixth embodiment of a joint of the present disclosure displayed in cross section.

Referring now to FIG. 6, another embodiment of the pipe joint 1 is illustrated. In the embodiment of FIG. 6, as in the embodiment of FIG. 5, the first ring 4 and the pin member 2 may be formed of the same material and integrally connected to each other. However, an O-ring (e.g., o-ring 21) may be omitted from the embodiment of FIG. 6. It may be understood, though, that such a fluid-tight seal can be inserted at an appropriate position of the pipe joint 1 of FIG. 6.

Methods for achieving a fluid tight seal between a first pipe and a second pipe are discussed in detail below.

A first method for achieving a fluid tight seal between a first pipe and a second pipe is characterized as follows:

In a first operation, the second ring 5 may be pushed over the pin member 2.

In a second operation, the first ring 4 may be screwed onto the pin member 2.

In a third operation, the combination of the pin member 2, the first ring 4, and the second ring 5 may be pushed into the box member 3.

In a fourth operation, the second ring 5 may be screwed into the box member 3. The second ring 5 may abut the engaging surface 16 of the first ring 4. By this screwing movement of the second ring 5, the box member 3 may be pushed against the pin member 2. Consequently a fluid tight seal may be achieved between the box member 3 and the stop area 17 of the pin member 2.

Beneficially, according to embodiments of the present disclosure, pin member 2, box member 3, first ring 4, and second ring 5 may be reassembled even after a pipe joint has been tightly assembled and afterwards dismantled again.

A second embodiment of a method for achieving a fluid tight seal between a first pipe and a second pipe is characterized as follows:

In a first operation, the first ring 4 may be placed into the box member 3.

In a second operation, the second ring 5 may be partially screwed onto the box member 3.

In a third operation, the pin member 2 may be forced into the assembly, which has been configured in the previous two steps.

In a fourth operation, the second ring 5 may be screwed into the box member 3 to its final position.

Embodiments of the above described methods may be suitable for metal components so that the pin member 2, the box member 3, the first ring 4 and the second ring 5 are of metallic material, such as steel. It may be understood, however, that embodiments of the joints of the present disclosure may be employed with joints formed from any materials, including, but not limited to, plastic materials. Furthermore, the same or different materials can be used instead for one or all components of the pipe joint.

During use, the pipe joint may experience tension and internal pressure, in combination with bending. Therefore, is relevant to see the actual behavior from the first pipe to the second pipe under said load conditions. Test conditions for such joints are, for example, defined by ISO 13670. This standard can be complied with by numerical modeling (e.g., finite element modeling, FEA) that simulates combinations of tension and internal pressure on a pipe joint. Such tests were applied to several samples formed in accordance with embodiments of the disclosed pipe joints. The samples all were configured with variations in the geometrical conditions, for example, taper, interference, diameter of the pipes and their thickness, as well as steel grades. Joints of embodiments of the present disclosure, according to the FEA (finite element analysis) analysis provide sealability against internal pressure under simulated loading conditions tested.

The design of embodiments of the joints was further verified by a full-scale testing program particularly developed to assess its performance. Based on the requirements of ISO 13670, this testing program evaluated sealability and a repeated loading in combination with bending. Embodiments of the joints of the present disclosure were found to successfully pass all stages of the testing program.

Table 1 presents the results of a sealability test (gas tightness) performed on pipes of 3½ inch outside diameter and 0.131 inches of wall thickness, under a bending of 20°/100 ft.

TABLE 1

| Load Condition | Tension [Kips] | Internal pressure [psi] | Gas-tightness of connection |
| --- | --- | --- | --- |
| Tension only | 50 | 0 | OK |
| Tension + internal pressure | 30 | 2600 | OK |
| Internal pressure only | 0 | 3000 | OK |

1 psi = 6894.75 N/m$^2$;
1 Kip = 448.22N;
1 inch = 0.0254 m;
1 foot = 0.3048 m

The embodiments of pipe joint 1 can be also be used, advantageously, in association with surface treatments that do not include dope. For example, in certain embodiments, in order to improve the quality of the joint 1, a surface treatment can be carried out, where the surface of the female threads 7 and 15 may be coated with Mn phosphate. A bare surface may be left on the male threads 9 and 19. This treatment may improve galling resistance of the pipe joint 1. In further embodiments, additional improvements may be achieved by using an API modified thread compound and an ecological thread compound together with Mn phosphate applied on a sand blasted surface.

In an embodiment of a surface treatment, in accordance with in EP 1554518, the entirety of which is hereby incorporated by reference, at least the surface of a threading may be configured with a surface roughness Ra comprised between 2.0 μm and 6.0 μm. The threading surface may further be covered by a first uniform layer of a dry corrosion inhibiting coating. This first layer may also be covered by a second uniform layer of dry lubricant coating.

The male threads 9 and 19 may be provided with a protective layer on the surface of the thread. The female threads 7 and 15 may be similarly configured or they can be made without the protective layer and be connected to the male threads 9 and 19 provided with the protective layer. The protective layer, in an embodiment, may comprise:

A first layer of dry corrosion inhibiting coating. The first layer may comprise an epoxy resin containing particles of Zn, deposited on the threading metal surface. These particles of Zn may comprise 99% pure Zn. The thickness of the first layer may vary within the range between 10 μm and 20 μm, preferably between 10 μm and 15 μm.

A second layer of dry lubricant coating. The second layer may comprise a mixture of $MoS_2$ and other solid lubricants in an inorganic binder. The thickness of the second layer may vary within the range between 10 μm and 20 μm, deposited over the surface of the dry corrosion inhibiting coating.

In a second embodiment of a surface treatment, also disclosed in EP 1554518, at least the surface of one or more of the threaded portions of the pipe joint may be configured with a surface roughness Ra that varies within the range between 2.0 μm and 6.0 μm. The threaded surfaces may further be covered by a single, substantially uniform layer of a dry corrosion inhibiting coating. The layer of the corrosion inhibiting coating may include a dispersion of particles of solid lubricant. The thickness of this layer may vary within the range between 10 μm and 20 μm.

The male threads 9 and 19 may be configured with the single uniform protective layer on the surface of the thread. The female threads 7 and 15 can be similarly configured or they can be made without the single uniform protective layer and be connected to the male threads 9 and 19 provided with the single protective layer.

In both cases, the layer of dry corrosion inhibiting coating containing the dispersion of particles of solid lubricant can be applied by spraying, brushing, dipping or any other method in which the coating thickness can be controlled.

Regarding the embodiments of the first and second surface treatments, the relevant segments, such as the pipe members 2, may be adapted to be assembled without the necessity of a further surface preparation prior to running in the field site or the addition of oil or grease. Furthermore, it is possible to transport and store relevant segments in the oilfield without risking that the segments lose their integrity because of corrosion on the threaded portions forming the connections. Beneficially, the connections can be assembled in the oilfield without removing the corrosion protection layer. Tests have identified that there is substantially no galling on either unthreaded areas or on threaded areas of the joint. Additionally, the tests identified that the connection had a very stable make up behaviour.

A third embodiment of a surface treatment is disclosed in WO 2007/063079, the entirety of which is incorporated by reference. The surface of the thread may be provided with a coating comprising, in a first variant, a first layer with high friction and anti-seize properties laid on the overall surface of the pin and a second layer with low friction properties laid on specific parts of the overall surfaces of either one of pin member 2 or box member 3. In a second variant, the surface of the thread may be provided with a coating comprising a first layer laid on the overall surface of the box and a second layer laid on selected portions of the overall surfaces of either one of pin or box. The specific selected portions may be those adapted to produce reciprocal radial contact, for example, crests in the female threads 7 and 15, roots in the male threads 9 and 19, and unthreaded areas.

The female threads 7 and 15 matching the male threads 9 and 19 can have a similar first layer and second layer on their respective surfaces or the thread can be made without the protective layers. In alternative embodiments, the layers can be made with a different structure or materials. In further embodiments, it is also possible to have a coating only on the surface of the male threads 9 and 19 and no coating on the surface of the female threads 7 and 15.

As one of ordinary skill in the art would understand, other coatings may be applied either below or above the coating without departing from the scope of the present invention. For example, a corrosion resistant layer can be applied over the coating, provided that the corrosion resistant layer does not affect the friction properties of the entire system. Additionally, the various coatings described herein may be applied to the overall surface of the male threads 9 and 19 or female threads 7 and 15, or only to selected areas. For example, the coatings may be applied to the threaded portions of the male threads 9 and 19 and the female threads 7 and 15, to unthreaded areas of the male threads 9 and 19 and the female threads 7 and 15, or to the shoulder portion of the pin member 2 and the box member 3 without departing from the scope of the present invention.

In any case, any of the embodiments of the surface treatments can be provided in combination with a minimum amount of dope.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A pipe joint for connecting a first pipe to a second pipe, the pipe joint comprising:
    a hollow pin member connected to an end of a first pipe;
    a hollow box member connected to an end of a second pipe, the hollow box member configured so as to at least partially surround the pin member;
    a first ring positioned adjacent an end of said pin member; and
    a second ring engaged with the box member and having a distal end extending axially in the direction towards the end of the pin member,
    wherein the second ring abuts against the first ring along at least a first surface, wherein the first surface is a beveled surface, and additionally a distalmost surface of the second ring abuts against the first ring at a second surface different than the first surface, wherein the second ring extends axially from the first ring in a direction opposite to the end of the pin member, and wherein the first ring abuts against said box member; and
    wherein the first ring comprises threads on an inner surface which are in mating contact with second threads on an outer surface of the pin member.

2. The pipe joint of claim 1, wherein the box member comprises first threads on an inner surface that are in contact with threads on an outer surface of the second ring.

3. The pipe joint of claim 2, wherein the second ring is positioned between the pin member and the box member.

4. The pipe joint of claim 2, wherein the pin member comprises a locating surface aligned in a transverse direction relative to the longitudinal axis of the pin member.

5. The pipe joint of claim 4, wherein the locating surface is in contact with the box member.

6. The pipe joint of claim 5, wherein the locating surface is aligned orthogonally relative to the longitudinal axis.

7. The pipe joint of claim 2, wherein the box member is connected to the second pipe directly or integrally.

8. The pipe joint of claim 2, wherein the first threads of the box member are at least one of a different thread height, different thread pitches, and a different form than the second threads.

9. The pipe joint of claim 2, wherein the first threads and second threads are of the same thread type.

10. The pipe joint according to claim 2, wherein the first threads are of a sawtooth type.

11. The pipe joint according to claim 2, wherein a surface of one or more of the threads on the inner surface of the first ring, second threads on the outer surface of the pin member, first threads on the inner surface of the box member, and threads on the outer surface of the second ring is covered by at least one of a protective layer and a lubricant layer.

12. The pipe joint of claim 1, wherein the first ring has an outer radial surface radially adjacent to an inner radial surface of the box.

13. A pipe joint for connecting a first pipe to a second pipe, the pipe joint comprising:

a hollow pin member connected to an end of a first pipe;

a hollow box member connected to an end of a second pipe, the hollow box member configured so as to at least partially surround the pin member;

a first ring positioned adjacent an end of said pin member; and a second ring engaged with the box member, wherein the second ring abuts against the first ring along a beveled surface and further abuts against the first ring on two generally radially extending surfaces, and wherein the second ring extends axially from the first ring in a direction opposite to the end of the pin member and wherein the first ring abuts against said box member; and wherein the first ring comprises threads on an inner surface which are in mating contact with second threads on an outer surface of the pin member.

14. The pipe joint of claim 13, wherein the first ring has an outer radial surface radially adjacent to an inner radial surface of the box.

15. The pipe joint of claim 13, wherein the second ring has a distal end extending axially in the direction towards the end of the pin member, and wherein the distalmost surface of the second ring abuts against the first ring.

16. The pipe joint of claim 13, wherein the box member comprises first threads on an inner surface that are in contact with threads on an outer surface of the second ring.

17. The pipe joint of claim 16, wherein the second ring is positioned between the pin member and the box member.

* * * * *